United States Patent [19]

Bopp

[11] 4,445,599
[45] May 1, 1984

[54] COOLING MEANS FOR TORQUE CONVERTER BYPASS

[75] Inventor: Warren G. Bopp, Farmington Hills, Mich.

[73] Assignee: Eaton Corporation, Cleveland, Ohio

[21] Appl. No.: 315,567

[22] Filed: Oct. 27, 1981

[51] Int. Cl.$^3$ .......................................... F16D 13/72
[52] U.S. Cl. ................. 192/3.29; 192/113 B; 192/58 R; 188/264 D
[58] Field of Search ............... 192/58.R, 58 A, 58 B, 192/113 B, 3.28, 3.29, 3.3, 3.31, 70.12, 82 T; 165/170, 47; 188/264 D, 264 E, 264 F, 264 CC, 264 R

[56] References Cited

U.S. PATENT DOCUMENTS

| | | | |
|---|---|---|---|
| 2,940,549 | 6/1960 | Hause et al. | 188/264 D |
| 3,063,532 | 11/1962 | Jaeschke | 192/113 B |
| 3,208,570 | 9/1965 | Aschauer | 192/113 B |
| 3,648,814 | 3/1972 | Barron | 192/113 B |
| 3,915,262 | 10/1975 | Klaue | 192/113 B |
| 4,004,668 | 1/1977 | Blair | 192/113 B |
| 4,317,510 | 3/1982 | Staub | 192/58 B |

Primary Examiner—George H. Krizmanich
Attorney, Agent, or Firm—C. H. Grace; P. S. Rulon

[57] ABSTRACT

A bypass drive line for a torque converter type automatic transmission in which the bypass drive line includes a viscous coupling and automatic transmission fluid is selectivley passed through the periphery of the viscous coupling to provide a flow of cooling fluid around the coupling. The fluid flowing through the coupling enters at one face of the coupling adjacent the periphery of the coupling and then flows around the periphery of the coupling through a plurality of separate elongated narrow passages and then exits at the opposite face of the coupling.

The passages are defined by a series of interconnected concentric peripheral grooves defined within the coupling. In one disclosed embodiment, four separate circuitous paths are provided through the coupling and in a second disclosed embodiment two separate circuitous paths are provided.

19 Claims, 6 Drawing Figures

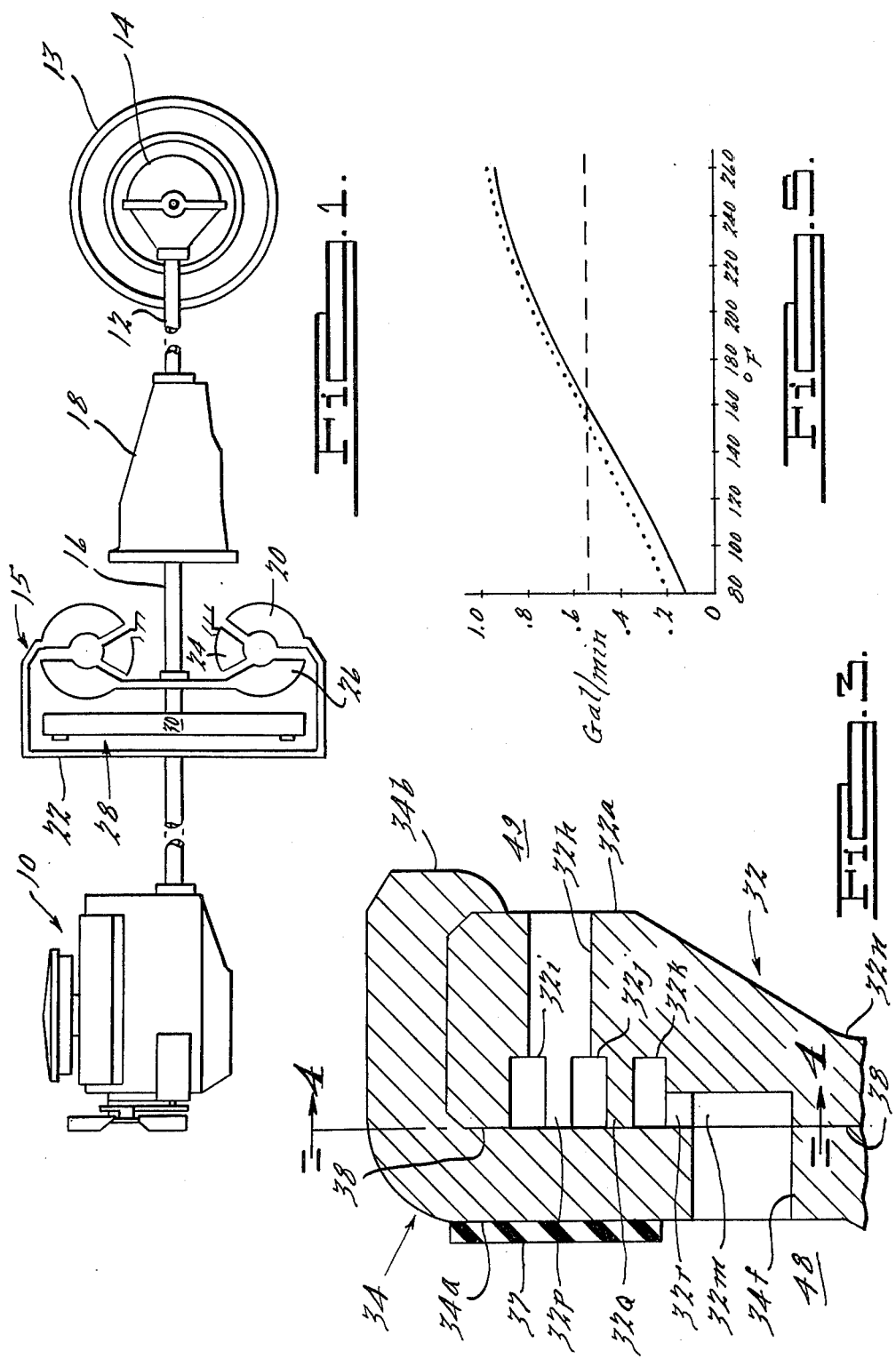

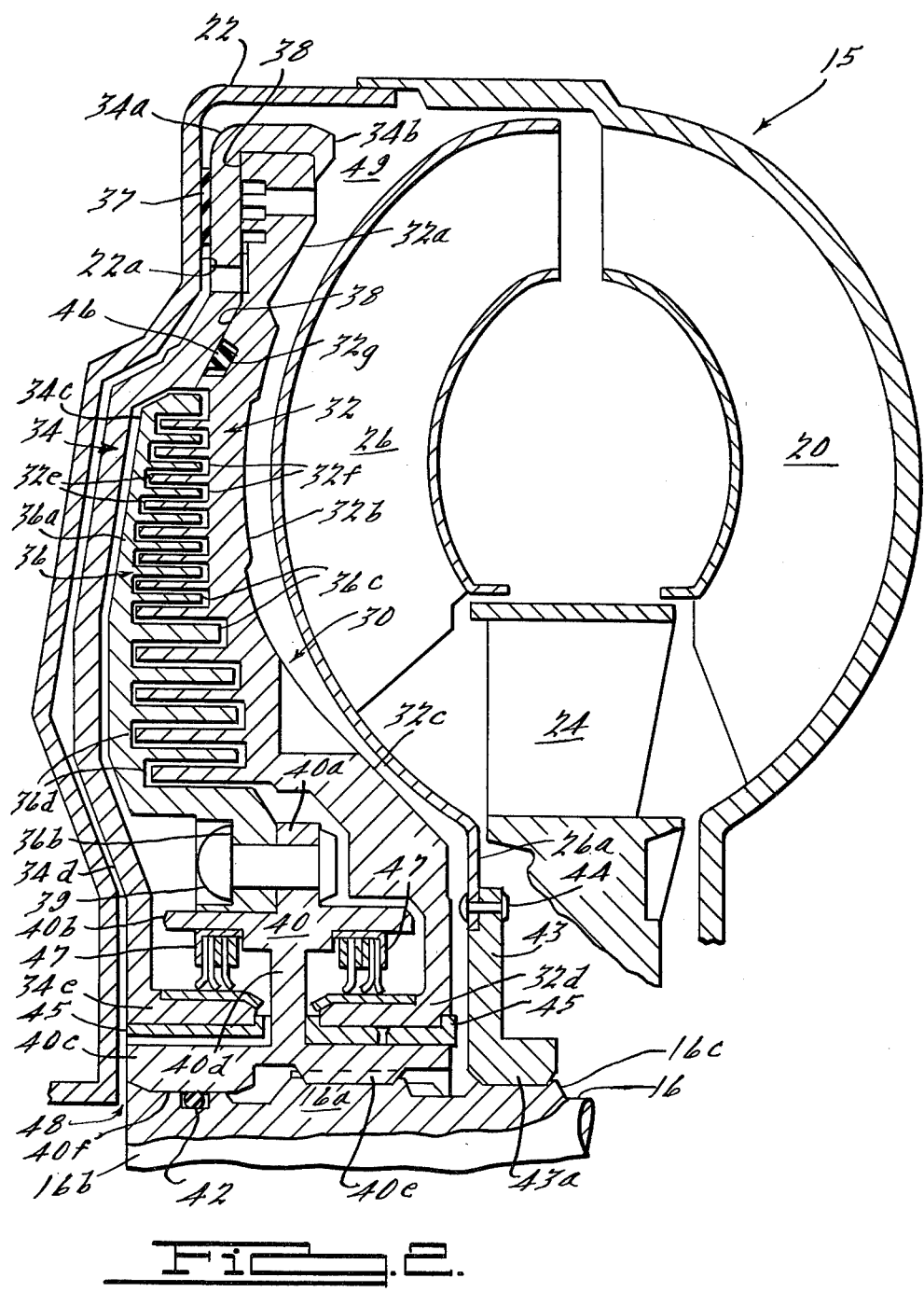

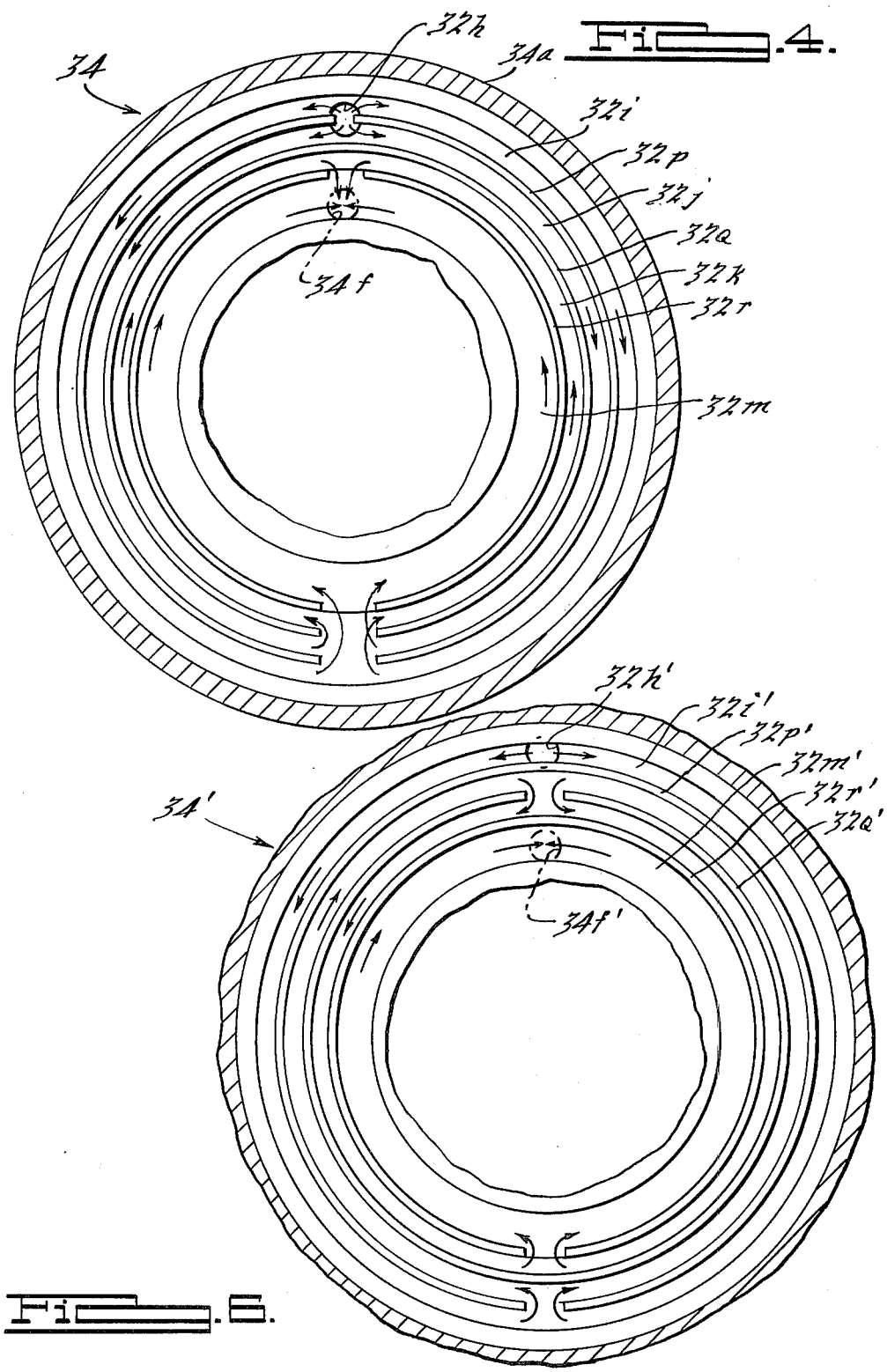

COOLING MEANS FOR TORQUE CONVERTER BYPASS

BACKGROUND OF THE INVENTION

This invention relates to automatic torque converter transmissions for motor vehicle applications. More particularly, it relates to automatic torque converter transmissions having means to selectively bypass the torque converter and, even more particularly, to a cooling arrangement for a viscous coupling utilized in a torque converter bypass.

This invention represents an alternative approach to the invention in U.S. Ser. No. 291,871 filed August 21, 1981 now U.S. Pat. No. 4,361,824 and assigned to the assignee of the present invention.

Torque converter type automatic transmissions have achieved almost universal application and acceptance in motor vehicles. While generally satisfactory in this application, torque converter automatic transmissions embody inherent slip and, therefore, incorporate inherent losses in vehicular fuel economy. In an effort to minimize this slippage and thereby optimize fuel economy, various efforts have been made to bypass the torque converter with some manner of direct drive which is typically brought into play when the vehicle is operating in the highest gear ratio and above a predetermined vehicular speed. While these direct drive bypass arrangements have resulted in improvements in fuel economy, they have also, under certain conditions, served to transmit various drive line vibrations to the passenger compartment of the motor vehicle, resulting in a derogation in the ride quality of the vehicle. IQ an effort to provide a bypass arrangement that would not transmit drive line vibration to the passenger compartment, it has been proposed that a viscous coupling be employed in the bypass drivetrain. While the use of a viscous coupling in the bypass drivetrain does serve to minimize transmission of drive line vibrations to the passenger compartment, it is imperative that the temperature of the liquid used in the viscous coupling be carefully controlled to avoid deterioration of the liquid with consequent derogation of the performance of the coupling.

SUMMARY OF THE INVENTION

An object of this invention is to control flow rate of a liquid as a function of viscosity.

Accordingly it is an object of the present invention to provide a simple and efficient means for cooling a viscous coupling.

It is a more specific object to provide a simple and efficient means for cooling the viscous coupling employed in a bypass drive train for a torque converter type automatic transmission.

The present invention represents an alternative approach to the coupling means described in previously referenced U.S. Ser. No. 291,871 and, like the cooling means of U.S. Ser. No. 291,871, finds application in any environment which includes a housing for containing a liquid and a partition dividing the housing into first and second liquid chambers sealed from each other by the partition. According to an important feature of the invention, a plurality of elongated narrow passages extends circuitously through the partition. The passages have a common single entrance opening in a first surface area on one side of the partition and a common single exit opening in a second surface area on the other side of the partition. Each passage has an effective length at least several times greater than the effective distance between the first and second surfaces of the partition, whereby to provide a plurality of long and narrow, but large surface area, flow paths between the liquid chambers to provide a rate of liquid flow through the passages between the chambers that varies significantly with variations in the viscosity, and thereby the temperature, of the liquid.

In the disclosed automatic transmission environment, the liquid housing is constituted by the housing of the automatic transmission; the partition within the housing is constituted by a generally circular and generally planar viscous coupling in a torque converter bypass drivetrain; and the cooling liquid passages extend circuitously through the viscous coupling to interconnect liquid chambers defined on either side of the viscous coupling and provide a variable flow of cooling liquid for the viscous coupling.

In the disclosed specific embodiments of the invention, the passages are constituted by a series of concentric grooves defined within the partition adjacent the periphery of the partition; the common single entrance opens into at least one of the grooves; the common single exit opens into at least one other of the grooves; and the grooves are selectively interconnected to define the plurality of passages extending circuitously through the partition.

In one disclosed specific embodiment of the invention, the common single entrance opens into the two radially outermost grooves and the common single exit opens into the two radially innermost grooves.

In another disclosed specific embodiment, the common single entrance opens into the radially outermost groove and the common single exit opens into the radially innermost groove.

These and other objects features and advantages of the invention will become apparent from the following detailed description of the Preferred Embodiments of the Invention.

BRIEF DESCRIPTION OF THE DRAWING

FIG. 1 is a schematic view of a motor vehicle drivetrain including a torque converter type automatic transmission employing a torque converter bypass drive embodying a viscous coupling;

FIG. 2 is fragmentary view on an enlarged scale of the viscous coupling seen schematically in FIG. 1;

FIG. 3 is a fragmentary view on a yet further enlarged scale of a peripheral portion of the viscous coupling of FIG. 2;

FIG. 4 is a sectional view taken on line 4—4 of FIG. 3;

FIG. 5 is a graph showing a plot of the flow rate of cooling liquid through the viscous coupling versus the temperature of the cooling liquid; and FIG. 6 is a sectional view, similar to FIG. 4, but showing a modified structure for the peripheral portion of the viscous coupling.

DETAILED DESCRIPTION OF THE PREFERRED EMBODIMENT

The motor vehicle drivetrain seen schematically in FIG. 1 includes an internal combustion engine 10, an automatic transmission 11, and a propeller shaft 12 driving rear wheels 13 through a differential 14.

Transmission 11 includes a torque converter 15 having an output shaft 16, and a gear ratio box 18 driven by torque converter output shaft 16. Torque converter 15 is filled with automatic transmission fluid and includes, in known manner, a pump 20 driven from engine 10 through torque converter housing 22, a stator 24, and a turbine 26 driven by pump 20 and driving torque converter output shaft 16.

Torque converter 15 further includes a bypass drive line seen generally at 28. Bypass drive line 28 is effective when actuated to provide a direct drive between torque converter housing 22 and torque converter output shaft 16 through a viscous coupling 30, thereby bypassing the high slippage drive path through pump 20 and turbine 26.

Viscous coupling 30 is best seen in FIG. 2. Coupling 30 is generally circular and generally planar and is of a sandwich construction including a first outer member or body 32, a second outer member or cover 34, and a central member or clutch 36 interposed between body 32 and cover 34. Cover 34 is preferably formed as an aluminum stamping and body 32 and clutch 36 are preferably formed as aluminum castings.

Body 32 includes a radially outer peripheral portion 32a, an intermediate portion 32b, and a radially inner portion 32c terminating in a hub portion 32d. Intermediate portion 32b is machined on its inner face to form a series of annular lands 32e separated by a series of annular grooves 32f. Another annular groove 32g is machined in the inner face of intermediate portion 32b radially outwardly of lands and grooves 32e, 32f.

Cover 34 includes a radially outer peripheral portion 34a rolled over at 34b to firmly grasp peripheral portion 32a of body 32, an intermediate portion 34c, and a radially inner portion 34d terminating in a hub portion 34e. An annular clutch lining 37 is adhesively secured to outer peripheral portion 34a for clutching coaction with the confronting inner surface 22a of torque converter housing 22.

The outer peripheral portions 32a and 34a of the body and cover are configured to nest snugly against each other to form an annular radially extending interface 38 and intermediate portions 32b and 34c of the body and cover are configured to define a chamber therebetween, radially inwardly of interface 38, for receipt of clutch 36.

Clutch 36 includes a working portion 36a and a mounting portion 36b. The side of working portion 36a confronting body 32 is machined to form a series of annular lands 36c separated by a series of annular grooves 36d. Lands 32e on body 32 are interdigitally arranged with respect to lands 36c on clutch 36. Mounting portion 36b is secured by rivets 39 to a central hub member 40.

Hub member 40 is formed as an iron casting and includes an external annular mounting flange portion 40a receiving rivets 39, an outer cylindrical portion 40b, an inner cylindrical portion 40c concentric with respect to outer cylindrical portion 40b, and an annular web portion 40d interconnecting cylindrical portions 40b and 40c. The inner periphery of inner cylindrical portion 40c is splined at 40e for coaction with a splined portion 16a of output shaft 16. The inner periphery of inner cylindrical portion 40c also forms a cylindrical sealing surface 40f for coaction with an O ring 42 mounted in an annular groove in end portion 16b of shaft 16. Shaft 16 also includes a splined portion 16c for coaction with splines 43a formed on the inner periphery of an annular mounting member 43 secured as by rivets 44 to the radially inner edge of mounting portion 26a of turbine 26, whereby to drivingly connect turbine 26 to torque converter output shaft 16.

Hubs 32d and 34e of the body and cover of the viscous coupling are journaled respectively on the opposite end portions of inner cylindrical portion 40c of hub member 40 with bronze bushings 45 interposed at the rotary interfaces to facilitate the bearing function.

The viscous coupling is filled with a silicone fluid, e.g. dimethyl polysiloxane. The silicone liquid is prevented from escaping radially outwardly by an elastomeric square cut sealing ring 46 positioned in groove 32g; and a pair of triple lip seals 47, positioned between the outer peripheries of hubs 32d and 34e and the confronting inner peripheries of outer cylindrical portion 40b of hub member 40, prevent the silicone liquid from escaping radially inwardly. Seals 47 also preclude leakage of automatic transmission fluid into the viscous coupling.

In the operation of the bypass driveline 28 as thus far described, automatic transmission fluid is normally admitted to the torque converter environment through the annular passage or chamber 48 formed between cover 34 and the torque converter housing 22. The presence of the fluid in passage 48 acting against cover 34 of the viscous coupling moves the viscous coupling to the right as viewed in FIG. 2 to its disengaged position (seen in FIG. 1) wherein lining 37 is separated from housing surface 22a to form an annular passage past the lining. The fluid thus flows radially outwardly in passage or chamber 48, past lining 37, and into the main chamber 49 of the torque converter. When it is desired to engage the bypass drive line, as, for example, when the vehicle is operating above a predetermined vehicle speed, the direction of flow of the automatic transmission fluid in the torque converter is reversed by actuation of a suitable solenoid valve, not shown. Specifically, the automatic transmission fluid is now admitted to main chamber 49 of the torque converter where it acts against body 32 of the viscous coupling and slides the coupling to the left as viewed in FIG. 2, to bring lining 37 into frictional engagement with housing surface 22a. The transmission now drives directly through the viscous coupling to output shaft 16, thereby bypassing the torque converter. Although there is a limited amount of slip in the viscous coupling occurring between body and cover 32, 34 and clutch 36, this slippage is significantly less than the slippage in the torque converter so that the overall efficiency of the transmission is significantly increased with corresponding improvements in vehicular fuel economy. And the viscous coupling, because of its cushioning effect, has the effect of eliminating the drive line vibrations that are transmitted to the passenger compartment in prior art bypass drive lines employing a solid mechanical driving connection.

It is, however, imperative that the temperature of the silicone liquid in the viscous coupling be carefully controlled since this liquid will deteriorate if allowed to overheat. It has previously been proposed to circulate automatic transmission fluid through the viscous coupling, with the coupling in its engaged position, into the passage or chamber 48 from whence it is axially withdrawn from the torque converter. Previous arrangements for providing this circulation have, however, proven to be complex and/or relatively ineffective. The present invention provides a simple and effective means of providing a flow of cooling fluid through the viscous coupling and into the chamber 48. For cooling purposes coupling 30 defines a partition dividing housing 22 into first and second liquid chambers, i.e., previously mentioned chambers 49 and 48. The chambers are sealed from each other when lining 37 engages surface 22c of housing 22. The first outer member 32 of coupling 30 defines a first surface area and the second outer member 34 of the coupling defines a second surface area.

According to the invention, and as best seen in FIGS. 3 and 4, a plurality of elongated narrow passages extend circuitously through the viscous coupling to interconnect main chamber 49 of the torque converter with chamber 48. The passages are defined by a first, or entrance, bore 32h in outer peripheral portion 32a of body 32; a second, or exit, bore 34f in the outer peripheral portion 34a of cover 34; and a series of annular grooves 32i, 32j, 32k, and 32m formed in outer peripheral portion 32a of body 32.

Entrance bore 32h extends axially and opens at its outer end in the outer face of body peripheral portion 32a in communication with main chamber 49 of the torque converter.

Exit bore 34f extends axially and opens at its outer end in the outer face of cover peripheral portion 34a in communication with chamber 48 and at a location in that face that is circumferentially aligned with entrance bore 32h but spaced radially inwardly from bore 32h.

Grooves 32i, j, k, and m are formed in the inner face of body peripheral portion 32a and extend circumferentially and concentrically around body 32.

The three radially outer grooves (32e, j, and k) have identical cross sectional profiles and may, for example, have an axial depth approximately forty percent greater than their radial width. Radially inner groove 32m may have an axial depth approximately half that of grooves i, j, and k and a radial width approximately twice that of grooves 32i, j, and k so that the cross sectional area of radially inner groove 32m approximates that of each of the radially outer grooves 32i, j, and k. The different cross sectional profile of radially innermost groove 32m is dictated by a desire to maintain the structural integrity of body 32 as it necks down at 32n.

Bores 32h and 34f and circular in cross section and may have a diameter that is approximately the same as the radial width of radially inner groove 32m (and thus approximately twice the radial width of grooves 32i, j, and k). Lanf portions 32p, q, and r between grooves 32i, j, k, and m may have a radial width approximating that of grooves 32i, j, and k.

Entrance bore 32h is radially centered on land 32p so that, as it is formed in a standard through drilling process, a portion of land 32p, corresponding in circumferential extent to the diameter of bore 32h, is removed. Bore 32h thus communicates directly with the two radially outermost grooves, 32i and 32j.

Exit bore 34f is aligned radially with radially inner groove 32m and aligned circumferentially with bore 32h. Land 32r is cut away immediately radially outwardly of bore 34f so that the two radially inner grooves, 32k and 32m, communicate directly with exit bore 34f. Land 32p, q, and r are also cut away at a circumferential location diametrically opposed to the located of bores 32h and 34f.

Bores 32h and 34f and interconnected grooves 32i, j, k, and m thus define a plurality of elongated narrow passages extending circuitously through the periphery of coupling 30 between a single entrance opening and a single exit opening. Specifically, as seen in FIG. 4, fluid flowing from chamber 49 through entrance bore 32h will initially divide between grooves 32i and 32j and will then immediately further divide between clockwise and counterclockwise flow around these channels. Four separate flow passages are thus defined. As the fluid reaches the cutouts in the lands diametrically opposite to bores 32h and 34f, it will flow radially inwardly through the cutouts and again divide itself into four separate return flow paths, constituted by the clockwise and counterclockwise aspects of radially inner grooves 32k and 32m. The fluid will flow in these four flow paths to exit bore 34f through which it will discharge, as a reunited flow, into chamber 48. The fluid thus flows between chambers 49 and 48 through four separate circuitous paths.

In a typical automotive application, the viscous coupling may have a diameter of approximately nine inches; the surfaces 34a and 32a may be separated by an effective distance of 0.3125 inches; bore 32h may have a diameter of 0.100 inches and a length of 0.1875 inches; bore 34f may have a diameter of 0.100 inches and a length of 0.125 inches; grooves 32i, j, and k may have a depth of 0.070 inches and a radial width of 0.050 inches, and groove 32m may have a depth of 0.035 inches and a radial width of 0.100 inches. With these dimensions, the length of each path provided through the viscous coupling is approximately 27 inches as compared to the 0.3125 inch path that would be provided by a simple bore extending axially through the periphery of the viscous coupling.

The use of an extended circuitous path through the viscous coupling provides an extremely large interface area between the automatic transmission fluid and the walls of the passages and thereby allows the temperature variations in the viscosity of the fluid to significantly impact the flow rate through the passage so that the flow rate varies significantly with variations in the temperature of the automatic transmission fluid. And the provision of four separate circuitous paths through the coupling, as compared to the single circuitous path provided in U.S. Ser. No. 291,871, provides an even higher ratio of surface area contact to flow volume and thereby provides an even more significant variation in flow rate with variations in the temperature of the automatic transmission fluid.

Specifically, as seen in the solid line in the graph of FIG. 5, whereas the flow rate in the cooling arrangement of FIG. 4 is practically zero at an automatic transmission fluid temperature of 80° F., it increases to approximately 0.40 gallons/minute at 130° F., 0.76 gallons/minute at 200° F., and 0.90 gallons/minute at 250° F. By comparison, as seen in the dashed line in the graph of FIG. 5, a straight 0.045 inch diameter bore through the coupling provides a flow rate that does not vary significantly over the same temperature range. The invention cooling arrangement will thus be seen to provide a relatively low flow rate of cooling fluid when the transmission is operating at a relatively low temperature, and a relatively high flow rate when the transmission is operating at a relatively high temperature. And, since the temperature of the silicone liquid in the viscous coupling, while higher than that of the automatic transmission fluid, is generally proportional to the temperature of the automatic transmission fluid, the invention cooling arrangement will be seen to provide a rate of flow of cooling liquid that is generally proportional to the temperature of the silicone liquid in the coupling. The invention cooling arrangement will thus be seen to provide a simple and effective means of controlling the temperature of the silicone liquid in the viscous coupling. Specifically, the invention arrangement, as compared to prior art arrangements, is relatively simple to manufacture, involves no valves or other moving parts, requires no costly calibration, provides excellent performance repeatability from unit-to-unit, and is extremely reliable.

An alternate embodiment of the invention is seen in FIG. 6. The embodiment of FIG. 6 is similar to the embodiment previously described except that entrance bore 32h' is positioned to communicate only with the radially outermost groove 32i', exit bore 34f' is positioned to communicate only with the radially innermost groove 32m', land portions 32p' and 32r' are cut away at a location diametrically opposed to bores 32h' and 34f, and land portion 32q' is cut away at a location circumferentially coincident with bores 32h' and 34f'. With this arrangement, and as shown by the arrows at FIG. 6, the fluid flowing through the coupling between chambers 49 and 48 divides itself into two paths, as opposed to the four paths of FIG. 4, but each path, since it extends twice around the periphery of the coupling, is twice the length of each path of FIG. 4. Total flow path length is thus roughly equivalent in the two disclosed embodiments as is the ratio of surface area contact to flow volume. Flow tests of the FIG. 6 embodiment produced the flow curve seen in the dotted line of FIG. 5.

While a preferred embodiment of the invention has been illustrated and described in detail it will be apparent that various changes and modifications may be made in the disclosed embodiment without departing from the scope or spirit of the invention.

What is claimed:
1. An apparatus comprising:
   A. A housing for containing a liquid;
   B. Means defining a partition dividing said housing into first and second liquid chambers sealed from each other by said partition, said partition having a generally planar configuration and including a first surface area on one side thereof in wetting juxtaposition to the liquid in said first liquid chamber and a second surface area on the other side thereof in wetting juxtaposition to the liquid in said second liquid chamber;
   C. Means defining a single entrance opening in said first surface area and a single exit opening in said second surface area, and
   D. Means defining a plurality of elongated narrow passages each extending circuitously through said partition between said single entrance opening and said single exit opening, each of said passages having an effective length at least several times greater than the effective distance between said surfaces to provide a plurality of long and narrow but large surface area flow paths between said chambers to provide a rate of liquid flow through said passages between said chambers that varies significantly with variations in the viscosity and thereby the temperature of the liquid.
2. An apparatus according to claim 1 wherein:
   D. Said passages are constituted by a series of concentric grooves defined within said partition adjacent the periphery thereof;
   E. Said entrance opening opens into at least one of said grooves;
   F. Said exit opening opens into at least one other of said grooves; and
   G. The grooves are selectively interconnected to define said plurality of narrow passages extending circuitously through said partition between said single entrance opening and said single exit opening.
3. An apparatus according to claim 2 wherein:
   H. Said at least one groove is disposed radially outwardly of said at least one other groove.
4. An apparatus according to claim 3 wherein:
   I. Said entrance opening opens into the two radially outermost grooves; and
   J. Said exit opening opens into the two radially innermost grooves.
5. An apparatus according to claim 3 wherein:
   I. Said entrance opening opens into the radially outermost groove, and
   J. Said exit opening opens into the radially innermost groove.
6. An apparatus according to claim 1 wherein:
   E. Said apparatus comprises an automatic transmission of the torque converter type and including a bypass driveline for the torque converter employing a viscous coupling;
   F. Said housing is constituted by the housing of the torque converter of the automatic transmission;
   G. The viscous coupling of the bypass driveline is arranged to move between a disengaged position in which drive occurs through the torque converter and an engaged position in which the viscous coupling clutchingly engages the housing of the torque converter to provide a driveline through the viscous coupling bypassing the torque converter.
   H. Said viscous coupling when in its clutchingly engaged position constitutes said partition means and divides said torque converter housing into said first liquid chamber constituted by the main chamber of the torque converter and said second liquid chamber constituted by a chamber on the opposite side of the viscous coupling; and
   I. Said passages extend circuitously through the viscous coupling to allow automatic transmission fluid to flow at a rate that varies with temperature from the main chamber and through the coupling to the chamber on the opposite side of the coupling.
7. An apparatus according to claim 6 wherein:
   J. Said passages are defined by a series of concentric grooves defined within said partition adjacent the periphery thereof;
   K. Said entrance opening opens into at least one of said grooves;
   L. Said exit opening opens into at least one other of said grooves, and
   M. The grooves are selectively interconnected to define said plurality of narrow passages extending circuitously through said partition between said single entrance opening and said single exit opening.
8. An apparatus according to claim 7 wherein:
   N. Said at least one groove is disposed radially outwardly of said at least one other groove.
9. An apparatus according to claim 8 wherein:
   O. Said entrance opening opens into the two radially outermost grooves, and
   P. Said exit opening opens into the two radially innermost grooves.
10. An apparatus according to claim 8 wherein:
    O. Said entrance opening opens into the radially outermost groove, and

P. Said exit opening opens into the radially innermost groove.

11. In a wet environment drive system of the type including a housing, a generally circular and generally planar assembly disposed within the housing and adapted to divide the housing into two liquid chambers sealed from each other by the assembly and disposed on opposite sides of the assembly and means operative to provide selective liquid flow between the two chambers through the assembly as a function of the temperature of the liquid; the improvement wherein said liquid flow means comprises:
- A. A plurality of concentric grooves defined within said assembly adjacent the periphery thereof;
- B. A first bore in said assembly opening at its outer end in one side face of said assembly in liquid communication with one of said chambers and opening at its inner end in at least one of said grooves;
- C. A second bore in said assembly opening at its outer end in the opposite side face of said assembly in liquid communication with the other of said chambers and opening at its inner end in at least one other of said grooves; and
- D. Means selectively interconnecting said grooves to provide a plurality of elongated narrow passages extending circuitously through said assembly between said first bore and said second bore.

12. A drive system according to claim 11 wherein:
- E. Said at least one groove is disposed radially outwardly of said at least one other groove.

13. A drive system according to claim 12 wherein:
- F. Said first bore opens into the two radially outermost grooves; and
- G. Said second bore opens into the two radially innermost grooves.

14. A drive system according to claim 12 wherein:
- H. Said first bore opens into the radially outermost groove, and
- I. Said second bore opens into the radially innermost groove.

15. A drive system according to claim 11 wherein:
- J. Said drive system comprises an automatic transmission of the torque converter type, and
- K. Said assembly comprises a viscous coupling in a driveline arranged to selectively bypass the torque converter of the automatic transmission.

16. A viscous coupling for use with an automatic transmission of the torque converter type, said coupling comprising an annular assembly adapted to be positioned within the housing of the torque converter and including:
- A. Means adjacent the axial center of the assembly adapted to drivingly engage the output shaft of the torque converter;
- B. Means adjacent the periphery of the assembly adapted to clutchingly engage the housing of the torque converter to transmit drive through the viscous coupling and bypass the torque converter;
- C. Means defining a single entrance opening in one side face of said assembly and a single exit opening in the opposite side face of said assembly, and
- D. Means defining a plurality of elongated narrow passages each extending circuitously through the assembly between said single entrance opening and said single exit opening, each of said passages having an effective length at least several times greater than the effective distance between said side faces whereby to provide a plurality of long and narrow but large surface areas flow paths between the chambers to provide a rate of liquid flow through said passages between said chambers that varies significantly with variations in the viscosity and thereby the temperature of the liquid.

17. A viscous coupling according to claim 16 wherein said passages are defined by:
- E. A plurality of concentric grooves defined within the assembly adjacent the periphery thereof;
- F. A first axial bore in the assembly opening at its outer end in said one side face of the assembly to define said entrance opening and opening at its inner end in at least one of said grooves; and
- G. A second axial bore in the assembly opening at its outer end in said opposite side face of the assembly to define said exit opening and opening at its inner end in at least one other of said grooves.

18. A viscous coupling according to claim wherein:
- H. Said annular assembly is of a sandwich construction and includes first and second outer annular members joined together at their peripheries to provide an annular radially extending interface and an inner member positioned within a chamber defined between said outer members radially inwardly of said annular innerface;
- I. Said inner member is adapted to drivingly engage the output shaft of the torque converter;
- J. Said clutching means comprises an annular clutching surface defined on the outer side face of said second outer member adjacent the periphery thereof;
- K. Said first bore extends axially through said first outer member adjacent the periphery thereof;
- L. Said second bore extends axially through said second outer member adjacent the periphery thereof and radially inwardly of said annular clutching surface;
- M. Said grooves are defined at said annular interface between said outer members.

19. A viscous coupling according to claim 18 wherein:
- N. Said grooves are defined in the innerface of said first outer member.

* * * * *